Sept. 1, 1931.  DE FOREST ROE  1,821,276
HAND TRUCK
Filed Nov. 30, 1928  2 Sheets-Sheet 1

De Forest Roe Inventor

By Frank M. Slough

His Attorney

Sept. 1, 1931.  DE FOREST ROE  1,821,276
HAND TRUCK
Filed Nov. 30, 1928   2 Sheets-Sheet 2
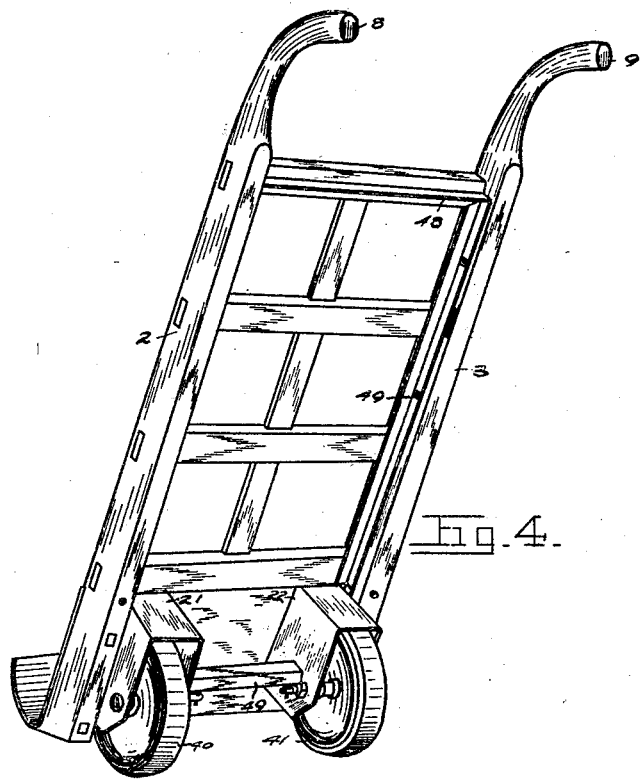

Patented Sept. 1, 1931

1,821,276

UNITED STATES PATENT OFFICE

DE FOREST ROE, OF ELYRIA, OHIO, ASSIGNOR TO THE COLSON COMPANY, OF CLEVELAND, OHIO, A CORPORATION OF OHIO

HAND TRUCK

Application filed November 30, 1928. Serial No. 322,667.

My invention relates to hand trucks, and relates particularly to hand trucks of a type adaptable for the handling of bags, barrels, boxes, rolls, and the like.

In the handling of bags, barrels and the like, by hand trucks, very often a great deal of dust, lint or other comminuted particles escape from the receptacles handled, and get into the truck roller bearings with a corresponding rapid deterioration of these bearings, necessitating frequent attention for purposes of lubrication, repair, and replacement of parts.

The present invention involves a hand truck having two wheels only disposed parallel near the forward end of the truck, and in which the bearings are not susceptible to deterioration because of foreign particles entering between the bearing surfaces, and which is most efficiently adaptable for use in handling bags and the like.

An object, therefore, of my invention is to provide a truck of the above character in which the bearings for the rollers employed are adequately protected from ingress of dust and dirt which otherwise would injure the bearing surfaces.

Another object of my invention is to provide a truck which may be readily controlled during the tilting operation and the reverse operation when the truck is restored to tractive position.

Another object of my invention is to provide a truck wherein the aforesaid objects are accomplished by a unitary element serving to carry out both of the aforesaid objects.

Another object of my invention is to provide an efficient, strong truck of the general character aforesaid.

These and other objects of my invention will become more apparent by reference to the following description, in which description reference will be had to the accompanying drawings forming a part of this specification.

Referring to the drawings:

Fig. 4 is a perspective view of the truck of my invention;

Figs. 5, 6 and 7 are relatively enlarged side, rear and plan views, respectively, of the metal hood which supports the wheels;

Figure 1:
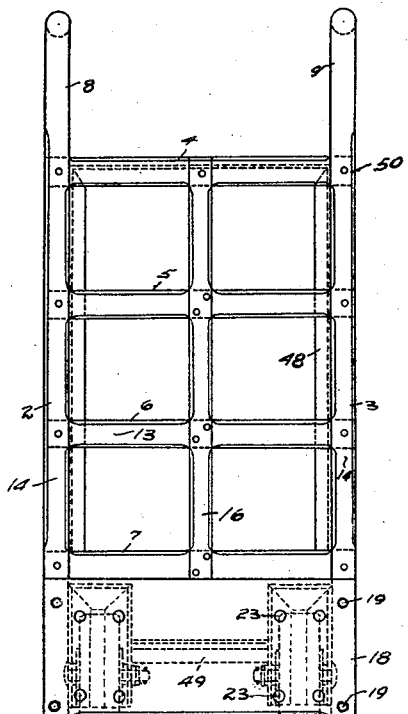
Fig. 1 is a front elevational view of a hand truck, certain parts thereof being shown in dotted lines.
Figure 2:
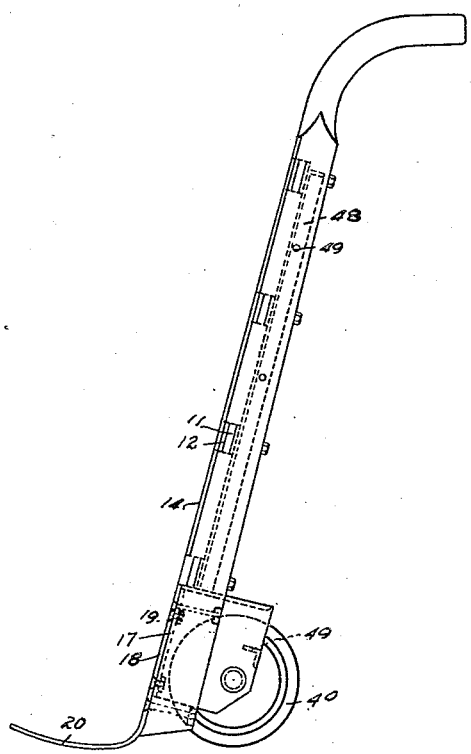
Fig. 2 is a side elevational view of the truck of Fig. 1.

Referring to the figures of the drawings, wherein like parts are designated by like reference characters; 2 and 3 are the side members of a substantially rectangular truck frame and are held in spaced parallel relation to each other by a plurality of cross slats 4 to 7 inclusive. The side members are of generally rectangular cross section and taper toward the upper end of the frame, where they are provided with curved extensions shaped to form a pair of handles or hand grips 8 and 9.

Figure 8:
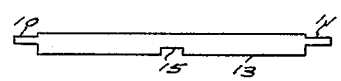
Fig. 8 is a plan view of one of the cross slats used in the truck of my invention.
Figure 9:
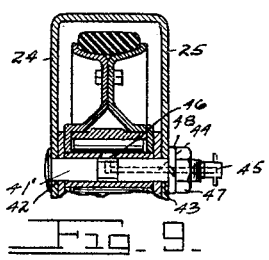
Fig. 9 is a vertical medial sectional view taken through a portion of a wheel and hood therefor.

The cross slats, as illustrated in Fig. 8, have their ends mortised at 10 and 11 to fit into slots 12 in the side members. The forward surfaces 13, of the slats, are flush with the forward edges 14, of the side members. In this embodiment all four of the cross slats are similar in construction, each being provided with a transverse groove 15 in the surface 13, adapted to receive a slat 16 therein which extends longitudinally intermediate the side members.

Figure 3:
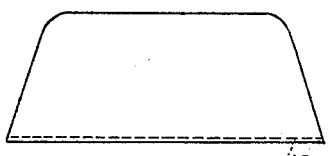
Fig. 3 is a bottom plan view of a toe plate.

A toe plate is attached to the lower end 17 of the frame, flush therewith, by bolts 19. It is made of sheet metal and comprises a flat rectangular portion 18, secured to the frame, and an angular curved free end 20, the edges of which converge toward the end and have the corners rounded, as best shown in Fig. 3.

A pair of wheel supporting hoods, 21 and 22, are secured to the rear of the toe plate adjacent the side members 14 by bolts 23. They may be formed of sheet metal as shown, and are provided with a pair of parallel side walls 24 and 25 held in spaced relation to each other by a top wall 26. The top and side walls are bent inward to form a short flange as at 29, 30 and 31. The corners of the flange 31, and those of the flanges 29 and 30, adjacent thereto, are cut diagonally and welded together, as at 32, materially stiffening the hood.

The flanges 29 and 30, are provided with apertures 33, through which bolts 23 extend, securing the hoods to the rear of the plate 18. A pair of rubber tired wheels 40 and 41 are rotatably journalled within the hoods upon axles 41′, which extend through axially aligned apertures 42 and 43 in the sides 24 and 25 of the hood.

Each axle is provided with a canal 44, and has a suitable grease fitting 45 connected therewith, through which grease may be supplied to the bearings. One end of the axle is provided with a head and the other end is threaded. A lock washer 48 and a nut 47 secure the axle within the hood.

A brace 49, of angular cross section, extends between the hoods, and is welded at each end to the hoods. The location of the brace is such that the operator may rest his foot upon it to break the load when it is desired to restore the truck to a tractive position. It also acts as a very efficient bracing means for the hoods.

The rear side of the truck frame is rigidly braced by a generally U-shaped reinforcing element 48, of angular cross section, which is secured to the side members by bolts 49. The forward edges of the slats and side members are rounded so as to present a smooth blunt surface 50, to come in contact with the articles which may be carried upon the truck.

The operation of the truck is quite similar to that of ordinary hand trucks. The hoods over the wheels keep the dust and dirt out of the bearings, especially where the truck is used in the handling of cement or the like. They also provide a light weight, strong and efficient support for each of the wheels.

The curved design of the toe plate presents a loading surface which securely holds the bags or the like without damage thereto, and permits the truck to be rocked thereon when discharging the load.

Although I have shown rubber tired wheels having roller bearings therein, it will be readily understood that any type of wheel consistent with the construction of the truck may be used.

Having thus described my invention in an embodiment thereof, I realize that numerous and extensive departures may be made from the construction herein shown, but without departing from the spirit of my invention.

I claim:

1. In a hand truck, a frame comprising a pair of spaced parallel side members and a plurality of laterally extending connecting cross members disposed intermediate said side members, a pair of the ends of said side members being formed to furnish hand grips for an operator, the other ends supporting thereon an angular plate, adapted to form a support for articles carried on the truck, a pair of wheel supports attached to said plate and a pair of wheels journalled in said supports, each of said supports being of hood form and comprising a pair of wheel bearing supports and a wheel shed portion disposed in the general direction of the wheel axis and at an angle to the plate.

2. In a hand truck, a frame comprising a pair of spaced parallel side members and a plurality of laterally extending connecting cross members disposed intermediate said side members, a pair of the ends of said side members being formed to furnish hand grips for an operator, the other ends supporting thereon an angular plate, adapted to form a support for articles carried on the truck, a pair of wheel supports attached to said plate and a pair of wheels journalled in said supports, each of said supports comprising a U-shaped element having a wheel shed portion disposed in the general direction of the wheel axis and at an angle to the plate.

3. In a hand truck, a frame comprising a pair of spaced parallel side members and a plurality of laterally extending connecting cross members disposed intermediate said side members, a pair of the ends of said side members being formed to furnish hand grips for an operator, the other ends supporting thereon an angular plate, adapted to form a support for articles carried on the truck, a pair of wheel supports attached to said plate and a pair of wheels journalled in said supports, each of said supports comprising a hood, a U-shaped reinforcing element for said frame, and a member extending between said hoods adapted to be engaged by the foot of an operator.

4. In a hand truck, a frame comprising a pair of spaced parallel side members and a plurality of laterally extending connecting cross members disposed intermediate said side members, a pair of the ends of said side members being formed to furnish hand grips for an operator, the other ends supporting thereon an angular plate, said plate being curved in a portion thereof and adapted to form a support for articles carried on the truck and positioned to form a floor rocker for the truck for dumping articles from the truck, a pair of wheel supports attached to said plate and a pair of wheels journalled in said supports, each of said supports comprising a hood, a U-shaped reinforcing element for said frame, and a member extending between said hoods adapted to be engaged by the foot of an operator.

5. In a truck, a frame, a wheel on the frame, the frame being provided with means for supporting a load thereon above the wheel, a support for the wheel on the frame and shed means to protect the wheel from dust or the like falling from the load, including a U-shaped hood enclosing the wheel, the closed end of the U disposed generally in the direction of the wheel axis and at an angle to the plane of load supporting frame means.

6. In a truck, a frame of open work type, a wheel on the frame, the frame being provided with means to support a load thereon above the wheel, a support for the wheel on the frame, and shed means to protect the wheel from dust or the like falling from the load through the openings of the frame, including a hood construction for the wheel which includes a shed element connected to the frame disposed generally in the direction of the wheel axis and projecting over the wheel in a generally horizontal direction, when the said frame is disposed in a generally vertical direction.

7. In a truck, a frame, a wheel on the frame, the frame being provided with means for supporting a load thereon above the wheel, a support for the wheel on the frame and shed means to protect the wheel from dust or the like falling from the load, including a U-shaped hood enclosing the wheel on two sides and at the top, the top of the hood disposed generally in the direction of the wheel axis and at an angle to the plane of the frame means.

8. In a truck, a frame, a wheel on the frame, the frame being provided with means for supporting a load thereon above the wheel, a support for the wheel on the frame and shed means to protect the wheel from dust or the like falling from the load, including a hood construction enclosing the wheel on two sides, at the front and at the top, the top being disposed in the general direction of the wheel axis and at an angle to the plane of the frame means.

9. In a truck, a frame, a wheel on the frame, the frame being provided with means for supporting a load thereon above the wheel, a support for the wheel on the frame and shed means to protect the wheel from dust or the like falling from the load, including a shed element connected to the frame and projecting over the wheel in a generally horizontal direction when the frame is disposed for use in a generally vertical direction.

10. In a truck, a frame, a wheel on the frame, the frame being provided with bed means for supporting a load thereon above the wheel, a support for the wheel on the frame and shed means to protect the wheel from dust or the like falling from the load, comprising a hood construction for the wheel which includes a pair of side members on which the wheel is rotatably supported and a top member joined to the side members and covering the wheel, the top member being disposed generally in the direction of the wheel axis and at an angle to the plane of the bed means.

11. In a truck, a frame, a wheel on the frame, the frame being provided with means for supporting a load thereon above the wheel, a support for the wheel on the frame and shed means to protect the wheel from dust or the like falling from the load, said means comprising a hood construction for the wheel which includes a U-shaped wheel support in the legs of which the wheel is rotatably mounted and a top member joined to the legs and covering the wheel, the top member being disposed generally in the direction of the wheel axis and generally horizontally when the truck frame is disposed for use in a generally vertical position.

12. In a hand truck, a frame comprising a pair of spaced parallel side members and a plurality of laterally extending connecting top members disposed intermediate said side members, a pair of the ends of said side members being formed to furnish hand grips for an operator, the other ends supporting thereon an angular plate adapted to form a support for articles carried on the truck, a pair of wheel supports attached to said plate and a pair of wheels journaled in said supports, each of said supports including a hood, and a member extending between said hoods adapted to be engaged by the foot of the operator.

In testimony whereof I hereunto affix my signature this 31st day of October, 1928.

DE FOREST ROE.